United States Patent [19]

Mayer

[11] 4,311,127

[45] Jan. 19, 1982

[54] METHOD FOR OPERATING AN INTERNAL COMBUSTION ENGINE AND INTERNAL COMBUSTION ENGINE FOR CARRYING OUT THIS METHOD

[76] Inventor: Werner Mayer, Neckarhalde 11, 7148 Remseck, Fed. Rep. of Germany

[21] Appl. No.: 49,128

[22] Filed: Jun. 18, 1979

[30] Foreign Application Priority Data

Jun. 19, 1978 [DE] Fed. Rep. of Germany ....... 2826807

[51] Int. Cl.³ ............................................ F02M 31/00
[52] U.S. Cl. ..................................... 123/557; 123/495
[58] Field of Search ............. 123/48 A, 48 AA, 78 A, 123/78 AA, 557, 558, 431, 495, 506, 507, 502; 239/87; 417/364

[56] References Cited

U.S. PATENT DOCUMENTS

| | | | |
|---|---|---|---|
| 1,749,975 | 3/1938 | Groff | 239/87 |
| 1,813,925 | 7/1931 | Hoffman | 123/78 A |
| 1,817,747 | 8/1931 | Hartley | 123/78 AA |
| 2,099,278 | 11/1937 | Schimanek | 123/557 |
| 2,590,575 | 3/1952 | Rogers | 239/88 |
| 3,945,352 | 3/1976 | Reimuller | 123/558 |

*Primary Examiner*—Ronald H. Lazarus
*Attorney, Agent, or Firm*—Max Fogiel

[57] ABSTRACT

A method for operating a combustion engine in which an oxygen-containing mixture is compressed in successive working strokes and thus heated and combusted, with the combustion gases expanding. Part of the fuel used is heated to at least its ignition temperature and then injected in the gaseous state into the oxygen-containing mixture according to a predetermined combustion process. The combustion is started by injecting heated fuel into the oxygen-containing mixture heated due to compression and is controlled by varying the amount of injected fuel, its distribution and the duration of the injection process. The fuel may be heated before injection by a separate heater, the hot combustion gases and by compressing the fuel. The fuel may be compressed by combining it with the mixture compression. The combustion process may be controlled by varying the pressure and/or the temperature of the fuel in the fuel delivery system or by varying the fuel composition, or by varying the flow cross sections in the fuel delivery system. The pressure of the oxygen-containing mixture may also be adjusted. A combustion engine for carrying out this method has at least one cylinder holding a reciprocating piston and a fuel delivery system. The fuel is drawn in and compressed by an intermittently operating piston compressor, and the fuel injection may use a valve.

12 Claims, 3 Drawing Figures

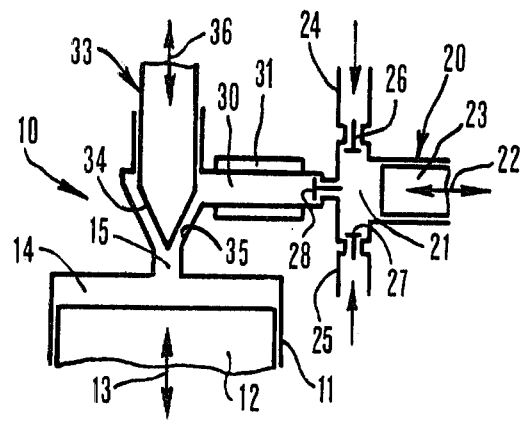
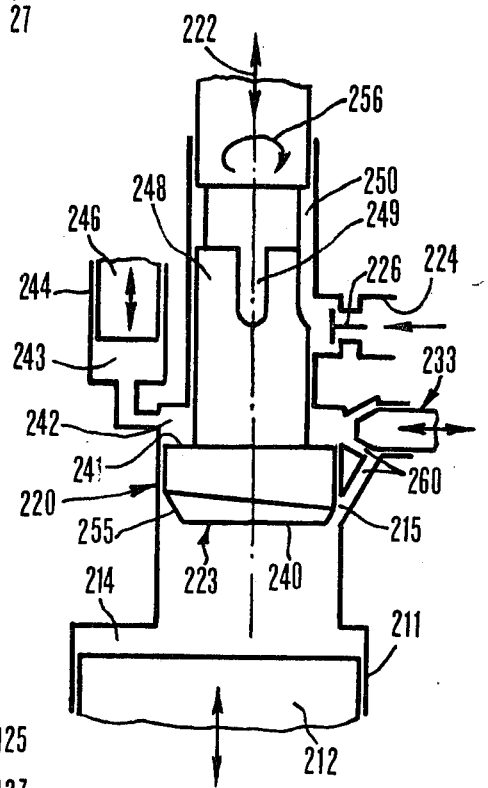
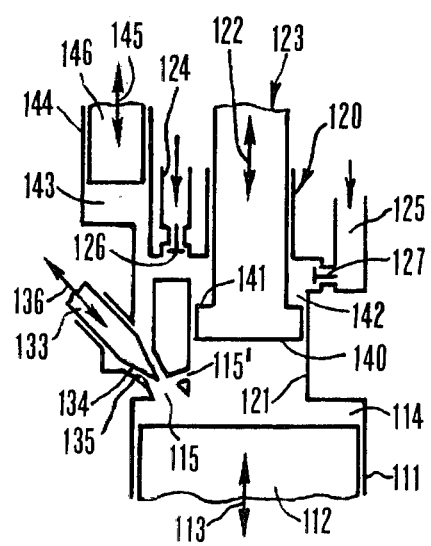
FIG. 1
FIG. 2
FIG. 3

METHOD FOR OPERATING AN INTERNAL COMBUSTION ENGINE AND INTERNAL COMBUSTION ENGINE FOR CARRYING OUT THIS METHOD

With known combustion engine processes with self-ignition of the fuel, the fuel injected into the combustion chamber must first evaporate in the highly compressed and thus highly heated combustion air and then heat at least to its self-ignition temperature before combustion can take place. In view of the heat withdrawn during evaporation and heating of the fuel from the combustion air, such processes are operable only with high compression of the combustion air and large air surplus which naturally leads to poor efficiencies and large machines.

There have been attempts to inject gaseous fuels into the combustion chambers of combustion engines. Even though the heat removal occurring with injection of liquid fuels could be reduced, these attempts have not been successful because, to ensure reliable ignition, an extremely high compression of the combustion air was required and efficient compressors were required for injecting the fuels. Consequently, machines operating on this principle are large and hence expensive.

Furthermore, the known combustion engine processes have proven difficult to control. It is the object of the invention to create a method for operating a combustion engine in which the combustion process can be controlled in a manner ensuring optimum motor operation. Furthermore, the invention is to create a combustion engine for carrying out such a controllable process.

Accordingly, the fuel used is heated in its entirety or partially before introduction into the process to at least its ignition temperature and then injected into the oxygen-containing mixture, according to a law governing the combustion process.

SUMMARY OF THE INVENTION

While the combustion method according to the present invention may also be used with processes operating with spark ignition, the start of the combustion may be initiated by the injection of the heated fuel into the oxygen-containing mixture heated by compression and the combustion process is controlled by controlling the amount of injected fuel, its distribution and the duration of the injection process. By distributing the fuel depending on the process, or depending on the crank angle of a rotating piston engine it is possible to influence the combustion process over a wide range. The fuel may be heated before injection into the oxygen-containing mixture by the action of a separate heater, of the hot combustion gases and/or the compression of the fuel which can be achieved combining with the mixture compression. The above possibilities of fuel heating can be effected separately or jointly. The fuel heating by combining with the mixture compression has proven particularly advantageous.

In a further embodiment of the invention, the combustion process may be controlled by varying the pressure and/or the temperature of the fuel in the delivery system and/or by varying the fuel composition. Direct factors for this control are the cross section through which the heated fuel is injected into the oxygen-containing mixture, and the pressure of the oxygen-containing mixture. Besides these direct factors are a multitude of additional influencing magnitudes influencing the law governing the combustion process, such as the pressure, the temperature and/or the composition of the fuel.

The advantages of the method for operating a combustion engine in accordance with the present invention are the following:

Fuel heated to at least its ignition temperature, and preferably above, ignites even when injected into cold air. This means that the mixture compression need not be designed for the ignition temperature of the fuel, but merely for a level ensuring an optimum combustion process. With fuel heated before injection to at least its ignition temperature, according to the invention, the ignition delay is extremely short and is determined only by the time of chemical reaction prior to the combustion of the fuel. Hence it is possible to control the start of combustion by the start of injection and by varying the injected amount during the developing process better than with known methods. This leads to a nearly complete combustion of the fuel with a correspondingly low incidence of toxic matter and to an improvement of the efficiency.

The combustion engine provided for carrying out the method according to the invention has at least one working cylinder with a reciprocating piston and a system for delivering fuel to the combustion chamber of the cylinder where the fuel delivery system has means for compressing and heating the fuel and a device for controlling the fuel injection into the combustion chamber of the cylinder.

The device for controlling the fuel injection into the combustion chamber may be a valve and an intermittently operating piston compressor may be the means for compressing the fuel before injection; this compressor also draws the fuels from a low-pressure line system. The valve for controlling the fuel injection into the combustion chamber may in the simplest case be a shut-off-member movable between an open position and a closed position, but it also may be a valve with continuously variable flow cross section.

In a particularly expedient embodiment of the combustion engine a piston compressor with a differential piston is used for compressing the fuel. The large piston area is exposed to combustion gases of the combustion chamber while the smaller piston area acts on the gaseous fuel, so that the latter due to proximity to the mixture compression in the combustion chamber undergoes a compression increased over the mixture compression with suitable heating.

In another preferred embodiment, the injection of the fuel into the combustion chamber can also be effected by means of the differential piston of the compressor for compressing the fuel by constructing this differential piston as control piston and exposing near its one end position injection openings which in that end position of the control piston are in direct connection with the combustion chamber of the combustion engine. On the side near the combustion chamber of the combustion engine, the differential piston is provided with a suitable control edge which consists of a chamfer continuously varying over the piston circumference, in which case the control piston must be rotatably adjustable about its lengthwise axis for setting the opening and closing time of the injection openings, but fixed in predetermined rotary positions.

According to another important feature of the invention, a pressure chamber of the fuel delivery system may be in direct connection with a supplementary adjustable volume. This supplementary volume may be a cylinder which is in direct flow connection with the pressure chamber of the fuel delivery system and is closed on one end by means of an adjustable piston.

Several embodiments of the invention will be explained below by means of the appended schematic drawings.

BRIEF DESCRIPTION OF THE DRAWINGS

FIG. 1 shows a partial view of a combustion engine with a fuel delivery system which has means for compressing and heating the fuel and for controlling the injection into the combustion chamber;

FIG. 2 shows a view similar to FIG. 1 with a modified fuel delivery system with a fuel compression due to locating a compressor piston next to the mixture compression in the combustion chamber; and FIG. 3 shows an embodiment, modified from FIG. 2, where the fuel injection into the combustion chamber is controlled by the compressor piston of the fuel compressor.

DESCRIPTION OF THE PREFERRED EMMBODIMENTS

In the combustion engine of FIG. 1, a piston 12, shown in its top position, reciprocates in a cylinder 11 along the cylinder axis with a predetermined stroke, as indicated by double arrow 13. Above the piston is a combustion chamber 14 which is connected with a fuel delivery system via an injection opening 15.

The fuel delivery system includes a piston compressor 20 with a piston 23 reciprocating in a cylinder 21 according to double arrow 22. Low-pressure fuel lines 24, 25 with valves 26, 27 closing during compressure intake and closing during compression are connected to the compressor cylinder. The compressor is connected via a pressure valve 28 to a pressure line 30 which has a heating device 31 (whose details are of no interest here) for heating the fuel beyond the temperature resulting from the compression. The pressure line 30 is in flow connection, which can be blocked, with the injection opening 15. A control element 33, movable relative to the injection opening, has a cone-shaped control surface 34 which cooperates with a corresponding seating surface 35. The control element is movable according to double arrow 36 so that, besides a complete blocking of the injection opening, there is a variable inflow cross section in the form of an annular gap tapering off cone-like towards the injection opening.

During operation of the combustion engine during return of the piston 22 of the fuel compressor 20, fuel flows from the low-pressure lines 24, 25 via the nonreturn valves 26, 27. After finishing the intake process, upon reversal of the direction of motion of the compressor piston 22, the nonreturn valves 26, 27 close and the fuel received in cylinder 21 undergoes compression until the closure force of valve 28 is overcome and a flow channel to pressure line 30 is opened. The compressed fuel is delivered via this flow path to the pressure line 30 and heated there above the compression end temperature by means of heating device 31. If the piston 12 of the combustion engine is in the end position shown in the figure, combustion air compressed in the combustion chamber 14 and meeting the process requirements is present in combustion chamber 14. When shut-off element 33 moves to the position shown in the figure, the compressed fuel, heated beyond its self-ignition temperature flows through the injection opening 15 into the combustion chamber via the conic annular gap between the conic surface 34 of the shutoff element and the conic seating surface 35, and reacts without appreciable ignition delay due to the encounter with the oxygen of the combustion air. Gaseous fuel is resupplied from the pressure line 30 during the combustion developing in combustion chamber 14 until the shutoff element 33 assumes its closed position blocking the inflow duct. Due to the combustion in the combustion chamber and the resulting pressure rise, the piston 12 undergoes a pressure application which causes return of the piston to its bottom dead center. It is evident that, by controlling the injection process with respect to the fuel quantity delivered during any phase of the combustion process and the duration of fuel delivery, the combustion process may be optimally controlled over a wide range.

In FIG. 2 the same reference numerals as in FIG. 1 were used for identical parts, but increased by one hundred.

With this embodiment the injection opening 115 discharges into the combustion chamber 114 of the working cylinder 111, but on the cylinder head side cylinder 121 of the piston compressor for compressing the fuel extends from the combustion chamber. A differential piston 123 moves along the axis of this cylinder of the fuel compressor with a large acting area 140 of this differential piston being exposed to the combustion gases of the combustion chamber while only an annular area 141 of piston 123 acts on the combustion gases drawn from low-pressure intake lines 124, 125 via valves 126, 127. The pressure line 30 shown in FIG. 1 is replaced by a compression chamber 142 which is followed by a so-called "supplementary volume" 143 which takes the form of cylinder 144 which on the head end is connected via a flow channel to the compression chamber for the gaseous fuel and is closed on the other end by a piston 146 adjustable according to double arrow 145. Again there is a shutoff element 133 with a conic control area 134 which cooperates with a similarly shaped seating surface 135 in the area of the injection opening 115. Between the inflow duct to the injection opening and the compressor cylinder 121 on the combustion chamber side there extends an auxiliary duct 115' which provides a restricted fuel injection in this cylinder section.

The operation of the embodiment of FIG. 2 differs from that of FIG. 1 in that the compressor piston 123, having the form of a differential piston, is directly exposed to combustion gases on side 140 facing the combustion chamber of the combustion engine. A movement of the compressor piston opposing this application of combustion gases, which movement is necessary to draw fuel from the low-pressure fuel delivery lines, is obtained, for example, by means of a rearside spring force on the compressor piston or in a different manner, which requires no further explanation since the required steps are familiar to a practitioner of the art.

When the working piston 112 of the combustion engine is in the vicinity of the bottom dead center, hence in a position removed from the one shown, the compressor piston 123 undergoes a movement towards the combustion chamber 114 because of the restoring force acting on it, with fuel being drawn from the low-pressure fuel lines 124, 125 via the valves 126, 127 into the compression chamber 142 of the compressor. With progressive movement of the working piston of the combustion engine towards its top dead center, the mixture in the working cylinder is compressed and the area 140 facing the combustion chamber has pressure applied to it according to this compression so that it is displaced against the restoring force acting on its rearside, with the rearside annular area 141 of the compressor piston compressing the fuel gases enclosed in the compression chamber after the nonreturn valves 126, 127 of the low-pressure fuel lines have closed. It is clearly evident that, through the selection of the ratio between front and rear sides 140, 141 of the compressor piston, a much higher compression of the fuel gases enclosed in the compression chamber 142 than in the mixture compression in the working cylinder is attained. By adjusting the piston 146, closing off the supplementary volume 143 the degree of fuel compression is influenced. As soon as the working piston 112 of the combustion engine has reached the top dead center and the combustion air or the oxygen-containing mixture of the working cylinder has been compressed according to the operating conditions of the engine, the control element 133 opens the passage to the injection opening 115 into the combustion chamber 114. Because of the pressure differences between the compression chamber 142 and the combustion chamber 114, fuel gases enter the latter; because of compression they are heated beyond their self-ignition temperature. Hence combustion starts in the combustion chamber of the combustion engine. The control of the fuel injection proceeds in the same manner as in the embodiment of FIG. 1 where in view of the pressure rise observed during combustion in the combustion chamber, the side 140 of differential piston 123 facing the combustion chamber receives a progressively increasing load so that the gaseous fuels present in the compression chamber of the fuel compressor are blown out more intensely into the combustion chamber of the combustion engine in view of this progressive load on the compressor piston, depending on the setting of the control element 133 or its open time interval.

In the embodiment of FIG. 3 identical reference numerals were used for identical parts, but increased by two hundred over those in FIG. 1.

This embodiment differs from the combustion engine of FIG. 2 in that the compressor piston 223 which is a differential piston whose side 240 facing the combustion chamber 214 is exposed to combustion gases of the working cylinder of the combustion engine simultaneously controls the injection of the gaseous fuels compressed in compression chamber 242 into the combustion chamber 214.

A low-pressure fuel delivery line 224 discharges into the fuel compressor 220 via a nonreturn valve 226. When the compressor piston 223 moves from the position shown towards the combustion chamber 214 of the combustion engine, gaseous fuel flows via that valve from this fuel delivery line 224. The piston stem 248 remote from the combustion chamber of the combustion engine opens a flow path 249 between a rearside suction chamber 250 and the compression chamber 242. If the compressor piston reverses due to force application on its area 240 facing the combustion chamber, the rear side piston stem 248 of the compressor piston blocks the flow connection between the suction chamber 250 and the compression chamber 242 and the fuels enclosed in the latter are compressed in the manner described for FIG. 2. Again, a supplementary volume 243 in the form of a closed cylinder 244 connected to the compression chamber and closed off on the rear by an adjustable piston 246.

Such a force application of the front side 240 connected to the combustion chamber of the combustion engine takes place during the compression of the oxygen-containing mixture in working cylinder 211. The movement of the compressor piston is attuned to the compression in the working cylinder so that a control edge 255 of the compressor piston facing the combustion chamber opens overflow ducts 260. These open a connection between the compression chamber 242 and the compressor cylinder chamber lying ahead of the compressor piston and hence the combustion chamber 214 of the combustion engine. Highly compressed fuel gases, heated beyond their self-ignition temperature, flow from the compression chamber and the connected supplementary volume into the combustion chamber. Thus the combustion in combustion chamber 214 is started in the same manner as with the embodiments of FIGS. 1 and 2, and is maintained during the delivery of more fuel gases from the compression chamber 242 and the supplementary volume 243. Control of the fuel injection may also be achieved by a control element 233 by means of which the flow cross sections between the compression chamber of the fuel compressor and the combustion chamber of the combustion engine are adjustable.

As soon as the fuel flows in the above manner from the compression chamber into the combustion chamber of the combustion engine and the combustion has been started, the combustion gases expand and in view of the working stroke of the combustion engine, the pressure acting on the front side 240 of the compressor piston drops and the compressor piston moves because of its rearside load (as in FIG. 2) towards the combustion chamber 214 of the combustion engine. The front side control edge 255 of the compressor piston closes off the overflow ducts 260 between the compression chamber 242 and the combustion chamber 214 so that further fuel delivery is stopped. During the continued upward stroke of the compressor piston, inflow paths 249 between the suction chamber 250 of the compressor and the compression chamber 242 are opened and fuel is again drawn from the low-pressure fuel line into the compression chamber. During the next working stroke of the combustion engine, the above-described process is repeated.

In contrast with the embodiments of FIGS. 1 and 2, in the embodiment of FIG. 3 the control element 233 is not actuated in the same cycle or rhythm with the working strokes of the combustion engine piston. The control element merely serves to vary the cross sections of the overflow ducts between the compression chamber of the fuel compressor and the combustion chamber of the combustion engine. The fuel quantity can be influenced by changing the pressure in the low-pressure line 224, with further control exerted by changing the supplementary volume 243.

The compressor piston side facing the combustion chamber has a control edge in the form of a chamfer 255 continuously varying over the circumference. Accordingly the compressor piston is rotatable in its cylinder guide, as indicated by rotary arrow 256, but detentable in predetermined rotary angle positions, so that, depending on the rotary angle setting of the compressor piston, the start of the fuel injection and hence a change of the start of combustion in the combustion chamber is possible.

I claim:

1. In a combustion engine, a combination comprising:

at least one cylinder, and a piston reciprocal in said cylinder;

a combustion chamber;

a fuel delivery system for said combustion chamber, including a piston compressor having a differential piston provided with a larger surface which in part bounds said combustion chamber and a smaller surface located in a compression chamber in which it compresses and thereby heats the gaseous fuel; and means defining flow channels extending from said compression chamber to outlets in a wall surface bounding the path of movement of said differential piston, the latter having a control edge which exposes said outlets when said differential piston is in or near an upper dead center position thereof, said differential piston compressing gaseous fuel for heating said fuel to a temperature dependent on the amount of compression, said differential piston controlling thereafter the time at which the compressed fuel is admitted into said combustion chamber of the engine.

2. The combination of claim 1, said differential piston having one end closer to and another end farther from said combustion chamber, said differential piston having an extension at said other end.

3. The combination of claim 1, wherein said smaller surface is an annular surface.

4. The combination of claim 1, wherein the stroke of said differential piston and the degree of fuel compression and heating in said compression chamber, are adjustable.

5. The combination of claim 1; further comprising means for adjusting the pressure in said combustion chamber and for thereby adjusting the timing of the exposure of said outlets.

6. The combination of claim 1; further comprising means for varying at least one of the pressure and temperature of gaseous fuel in said compression chamber.

7. The combination of claim 1, wherein said control edge is a bevel which continuously varies over the circumference of said differential piston, and wherein said differential piston has a longitudinal axis and is turnable about the same to a plurality of arrestable positions.

8. The combination of claim 1; and further comprising means for varying the cross-section of said flow channels.

9. The combination of claim 1; and further comprising auxiliary means defining a chamber of variable volume in direct communication with said compression chamber.

10. The combination of claim 9, said auxiliary means comprising a cylinder in direct flow communication with said compression chamber and having an end portion remote from said compression chamber, and an adjustable piston closing said end portion.

11. The combination of claim 1; further comprising means defining fuel-admitting passages in said differential piston for admission of fuel into said compression chamber when said differential piston is in or near its lower dead center position.

12. The combination as defined in claim 1, said differential piston having one end closer to and another end farther from said combustion chamber, said differential piston having an extension at said other end; said smaller surface being an annular surface; the stroke of said differential piston and the degree of fuel compression and heating in said compression chamber, being adjustable; means for adjusting the pressure in said combustion chamber and for thereby adjusting the timing of the exposure of said outlets; means for varying at least one of the pressure and temperature of gaseous fuel in said compression chamber; said control edge being a bevel which continuously varies over the circumference of said differential piston, and wherein said differential piston has a longitudinal axis and is turnable about the same to a plurality of arrestable positions; means for varying the cross-section of said flow channels; auxiliary means defining a chamber of variable volume in direct communication with said compression chamber; said auxiliary means comprising a cylinder in direct flow communication with said compression chamber and having an end portion remote from said compression chamber, and an adjustable piston closing said end portion; means defining fuel-admitting passages in said differential piston for admission of fuel into said compression chamber when said differential piston is in or near its lower dead center position.

* * * * *